Patented May 12, 1925

1,537,859

UNITED STATES PATENT OFFICE.

THOMAS W. MILLER, OF ASHLAND, OHIO.

METHOD OF VULCANIZING RUBBER AND THE LIKE.

No Drawing.   Application filed December 23, 1922.   Serial No. 608,751.

*To all whom it may concern:*

Be it known that I, THOMAS W. MILLER, a citizen of the United States, residing at Ashland, county of Ashland, State of Ohio, have invented certain new and useful Improvements in Methods of Vulcanizing Rubber and the like, of which the following is a specification.

My invention relates to the vulcanization of rubber and the like, and has for its object to provide an improved method of treating such substances as to effect a practically perfect vulcanization in a comparatively short time and at low temperature.

More specifically, my invention aims to provide a method whereby an organic accelerator may be incorporated in the rubber compound during the milling operation, together with the sulphur without danger of premature vulcanization during either the milling or the calendering operation. Heretofore it has been found that if an attempt is made to form a rubber compound embodying rubber, sulphur, an organic accelerator, and a metallic oxide, such as oxide of zinc, lead or lime, the result of combining these several ingredients is that, during the operation of milling or calendering the material in particular, wherein more or less heat is applied thereto, a premature vulcanization will occur, which is liable to ruin the stock. I have discovered, however, that a compound embodying the rubber, sulphur and the organic accelerator can be milled and calendered without practically any resultant premature vulcanization, and that the desired vulcanization can be secured by the after application thereto of the metallic oxide, which may be applied either in a powder upon the surface of the compound, or by subjecting the compound when in the vulcanizing chamber to a current of air charged with the metallic oxide, or said metallic oxide may be applied thereto in a liquid solution while being subjected to the vulcanizing heat.

In carrying my improved method into effect, the stock first is milled, a proper quantity of sulphur and any suitable organic accelerator being incorporated therein during said operation. Said milled stock then is calendered or formed otherwise to the desired thickness, and preferably while the compound is still hot, the same may be dusted with cornstarch or the like, having mixed therewith a suitable quantity of metallic oxide, such as zinc, lead or lime. Or, if desired, the compound may be packed in such a mixture of cornstarch and metallic oxide. While it is not absolutely necessary to apply the oxide while the stock is warm, still it has been found to be advantageous, as warm stock better absorbs the desired percentage of the coating. And I have also found that the metallic oxide may be applied to the stock while in the vulcanizing chamber and being subjected to the vulcanizing heat, by means of a current of air carrying said oxide. Or if desired, the metallic oxide may be dissolved in a liquid solution, into which the stock may be immersed, said solution being brought to a temperature sufficient to effect vulcanization.

It will be understood that the compound after milling may be pre-formed to any desired shape or size, that is to say, to the shape of the finished article, and the metallic oxide applied thereto for the subsequent vulcanizing step.

I have found that the following formula for the compound obtains very good results, though I do not wish to be understood as limiting myself to the proportions named:

|   | Per cent. |
|---|---|
| Rubber | 95 |
| Sulphur | 3 |
| Accelerator | 2 |

Having thus fully described my invention, what I claim and desire to secure by Letters Patent, is:—

1. The method of vulcanizing rubber compounds, which consists in first forming the compound of rubber, sulphur and an organic accelerator, and then while subjecting the same to the vulcanizing heat also subjecting it to the action of a metallic oxide.

2. The method of vulcanizing rubber compounds containing rubber, sulphur and an organic accelerator, which consists in applying to the exterior surface of the compound a metallic oxide, and subjecting the same to a vulcanizing heat.

3. The method of vulcanizing rubber compounds containing rubber, sulphur and an organic accelerator, which consists in dusting or packing the compound in a metallic oxide, and then subjecting the same to a vulcanizing heat.

4. The method of vulcanizing rubber compounds, which consists in first forming the compound of rubber, sulphur, and an accelerator, then subjecting it to the action of a liquid containing a metallic oxide, and finally vulcanizing the same.

In testimony whereof I hereunto affix my signature.

THOMAS W. MILLER.